Patented Apr. 14, 1931

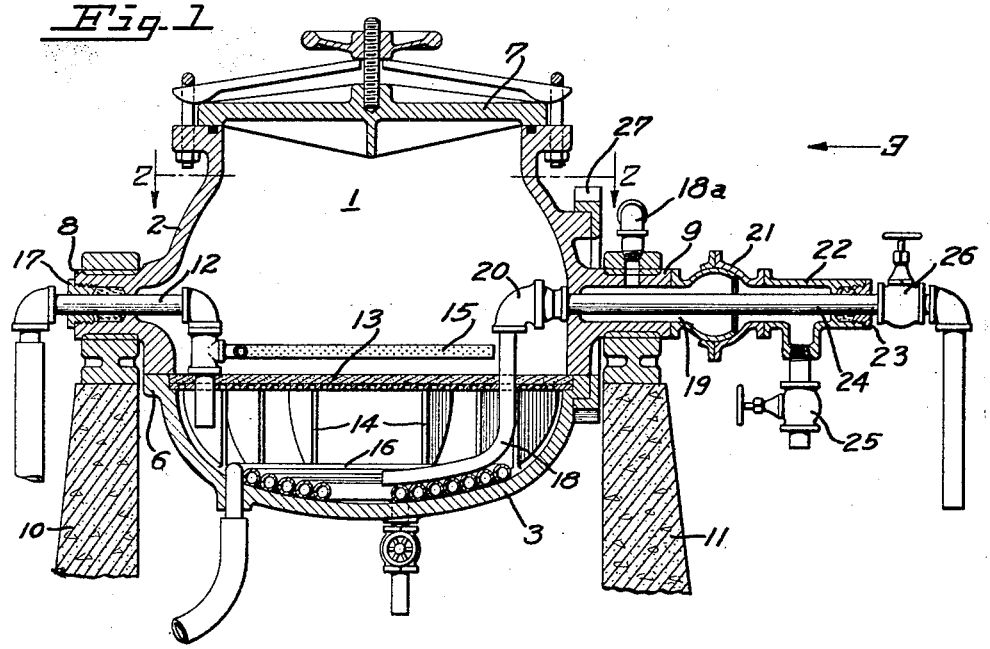
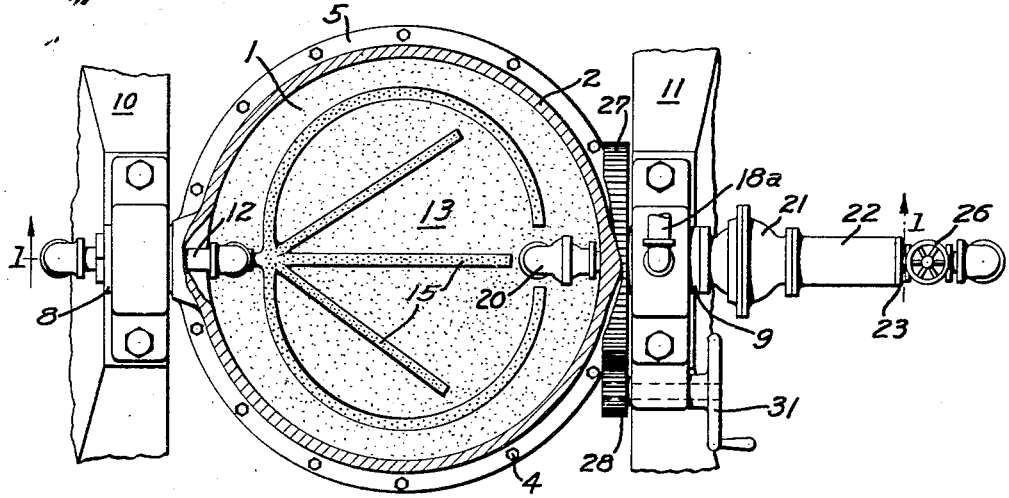

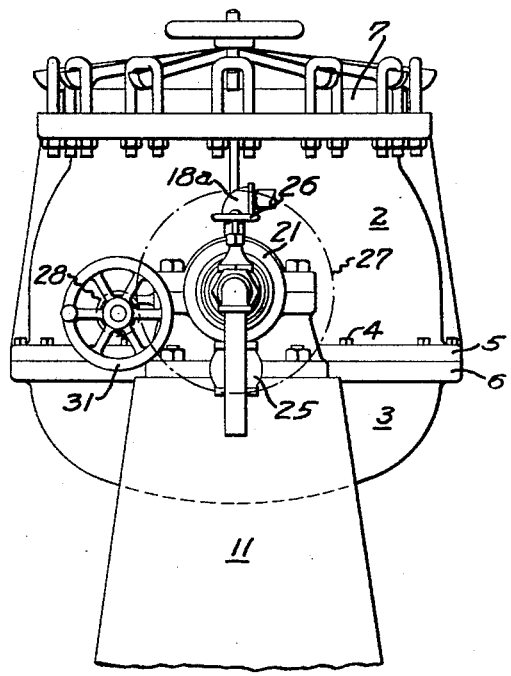

1,800,605

UNITED STATES PATENT OFFICE

ARTHUR J. CROWLEY, OF SULPHUR, NEVADA, AND HAROLD L. HAZEN, OF BERKELEY, CALIFORNIA, ASSIGNORS, BY MESNE ASSIGNMENTS, TO SIERRA SULPHUR CORPORATION LTD., A CORPORATION OF NEVADA

SULPHUR EXTRACTOR

Application filed July 6, 1927. Serial No. 203,792.

Our invention relates to an apparatus and method for extracting sulphur from sulphur ores, sulphur concentrates or any other sulphur containing material in which the sulphur is mechanically enclosed by the material, and the broad object of the invention is to extract the sulphur by means of a heated liquid at a high pressure.

Another object of the invention is the provision of a sulphur extractor in which the pressure is so maintained by means of an outlet valve, so as to gradually remove the sulphur from the extractor.

Another object of the invention is the provision of a sulphur extractor which is compact in structure and which adapts itself for ready manipulation.

Another object of the invention is the provision of a sulphur extractor having hollow trunnions; one for the admittance of a steam pipe, the other for a sulphur outlet pipe.

Another object of the invention is the provision of a sulphur extractor having steam distribution coils located so as to rapidly extract the sulphur from the sulphur containing materials.

Other objects of the invention together with the foregoing will be set forth in the following description of our preferred embodiment of means for practicing the invention and which is illustrated in the drawings accompanying and forming part of the specification. It is to be understood that we do not limit ourselves to the showing made by the said description and drawings, as we may adopt variations of our preferred form within the scope of our invention as set forth in the claims.

Referring to the drawings:

Figure 1 is a vertical sectional view of a sulphur extractor embodying our invention. The plane of section is indicated by the line 1–1 of Figure 2.

Figure 2 is a horizontal sectional view of the sulphur extractor, the plane of section being indicated by the line 2–2 of Figure 1.

Figure 3 is an end elevation of the sulphur extractor, looking towards the sulphur outlet point.

In terms of broad inclusion, our sulphur extractor comprises a chamber which has therein a filter medium upon which the sulphur containing materials are adapted to rest. Leading into the chamber is a pipe for admittance of extracting steam which is maintained at a pressure high enough to form superheated water having a temperature sufficient to melt the sulphur which flows thru the filter into the bottom of the chamber and collects around and covers a sulphur outlet pipe which leads from within or from the chamber to a point outside of the chamber and has a valve therein. A gauge pressure of about 15 lbs. per square inch in order to obtain a temperature of around 250° F. is sufficient to melt the sulphur. By regulating the degree of opening of the valve, the sulphur extracted by the superheated water gradually passes out thru the pipe due to the fact that the pressure in the chamber is higher than atmospheric pressure. The sulphur outlet pipe is provided with a steam jacket so as to prevent the sulphur from freezing in its passage thru the pipe.

More specifically, our sulphur extractor comprises a pressure chamber 1 which consists of two sections 2 and 3 held together by means of the bolts 4 passing thru the flanges 5 and 6 of the top and bottom sections respectively, and a removable head 7 clamped into position on the top of the chamber. The chamber is mounted on hollow trunnions 8 and 9, resting on the supports 10 and 11. A steam pipe 12 passing thru the core of trunnion 8 leads into the bottom of the chamber, preferably below the surface of a filter plate 13, consisting, preferably, of fused silica or any other suitable straining medium, maintained in position by suitable supports 14. Branch or primary steam pipes 15 are preferably located near and above the filter plate, while below the filter plate the chamber may be steam jacketed or preferably provided with a steam coil 16 in order to maintain the proper temperature in that portion of the chamber. A stuffing box gland 17 around pipe 12, serves to seal the core of trunnion 8.

A sulphur outlet pipe 18 extends from a point within the chamber below the filter plate thru the core of trunnion 9, so as to provide a steam passage 19, which is sealed at its end adjacent the chamber and is provided with a steam inlet pipe 18a which passes thru the bearing of trunnion 9. A ball joint 20 permits movement of the end of the pipe within the chamber. The passage 19 is continued thru a ball joint 21 and thru a pipe 22, the end of which is sealed by a stuffing box gland 23, which fits around pipe 24, connected to the sulphur outlet pipe. A valve 25 permits the escape of steam thru passage 19 while valve 26 permits the passage of the molten sulphur thru the pipe 24.

By means of gears 27 and 28, the chamber may be rotated on bearings 29 and 30 by turning the wheel 31 as is readily seen from the drawings.

The operation of the apparatus is carried on in the following manner. The head may be removed and thru a suitable spout or other means the sulphur containing material such as ore or concentrate is deposited on the filter plate. After the sulphur has been deposited on the filter plate, the head is fastened into position, and the valves are adjusted to maintain a pressure in the chamber which is above atmospheric pressure, so as to provide a temperature high enough to melt the sulphur when the extracting steam is admitted into the chamber. The extracting steam is admitted thru the steam pipe and also thru the branch pipes, thus increasing the speed at which the operation is carried on. A pressure high enough to convert part of the steam into superheated water, is allowed to develop within the chamber. By means of valve 26 the temperature and pressure within the chamber may be readily controlled. The superheated water permeates the sulphur containing material, melting the sulphur, and extracting it therefrom. The molten sulphur thus freed from the sulphur containing material runs thru the filter and being heavier than the water and having a greater surface tension, collects at the bottom to a level above the outlet pipe 18 where it is maintained in molten condition by means of the heating coils and is gradually withdrawn thru pipe 18 from the chamber due to the fact that the pressure outside the chamber is less than that within.

The sulphur runs out thru the sulphur outlet which is surrounded by the steam jacketed passage, thus maintaining the sulphur in molten condition.

After the sulphur has been extracted from the concentrate and most of it has been withdrawn from the chamber, the steam is shut off and the valves are completely opened. The head is taken off and due to the decrease in pressure, which causes a drop in temperature, the remaining sulphur in the bottom of the chamber solidifies. The chamber is then inverted by turning it over on its trunnions, thus discharging the residue remaining on the filter plate, and the water in the bottom of the chamber is also discharged and in its passage thru the filter plate it flushes and cleans the plate. The solidified sulphur remains in the bottom of the chamber. The chamber is then turned to its normal position, and a fresh charge of concentrate is placed on the filter plate and the process repeated.

The sulphur remaining in the bottom of the chamber melts upon continuation of the process, hence it will be observed that no steam can pass out thru the sulphur outlet pipe 18, since a seal of sulphur is always maintained about the opening in the pipe.

We claim:

1. An apparatus for extracting sulphur comprising a chamber, hollow trunnions for supporting the chamber, a steam inlet pipe passing thru one trunnion, and forming a tight joint therewith, and a sulphur outlet pipe passing thru the other trunnion so as to provide a passage around said pipe.

2. In an apparatus for extracting sulphur, a chamber, a cover therefor, a filter within the chamber, a steam inlet pipe leading into the chamber and extending to a point between the bottom of the chamber and said filter, a sulphur outlet pipe extending from the chamber at a point between the bottom of the chamber and the filter, and a passage surrounding the sulphur outlet pipe.

3. In an apparatus for extracting sulphur, a chamber, a filter within the chamber, a steam inlet pipe leading into the chamber and extending to a point below said filter, and steam distributing means above said filter.

4. In an apparatus for extracting sulphur, a chamber, a filter within the chamber, a steam inlet pipe leading into the chamber and extending to a point between the bottom of the chamber and the filter, steam distributing means above the filter, and heating means in the bottom of the chamber.

5. In an apparatus for extracting sulphur, a chamber, a filter within the chamber, a steam inlet pipe leading into the chamber and extending to a point between the bottom of the chamber and the filter, steam distributing means above the filter, and a sulphur outlet pipe extending from the chamber at a point below said filter.

In testimony whereof, we have hereunto set our hands.

ARTHUR J. CROWLEY.
HAROLD L. HAZEN.